United States Patent [19]

Neumaier et al.

[11] Patent Number: 4,830,549

[45] Date of Patent: May 16, 1989

[54] HAND-HELD DEVICE WITH TOOL SENSING MEANS

[75] Inventors: Anton Neumaier, Fürstenfeldbrück; Uto Plank, Freising, both of Fed. Rep. of Germany

[73] Assignee: Hilti Aktiengesellschaft, Fürstentum, Liechtenstein

[21] Appl. No.: 210,666

[22] Filed: Jun. 20, 1988

[30] Foreign Application Priority Data

Jun. 20, 1987 [DE] Fed. Rep. of Germany ....... 3720512

[51] Int. Cl.[4] .............................................. B23B 45/02
[52] U.S. Cl. ........................................ 408/9; 173/104
[58] Field of Search ............... 173/29, 48, 104; 408/8, 408/9

[56] References Cited

U.S. PATENT DOCUMENTS

| | | | |
|---|---|---|---|
| 4,292,571 | 9/1981 | Cuneo | 408/9 |
| 4,540,318 | 9/1985 | Hornung et al. | 408/9 |
| 4,673,318 | 6/1987 | Hornung et al. | 408/9 |

*Primary Examiner*—Frank T. Yost
*Assistant Examiner*—James L. Wolfe
*Attorney, Agent, or Firm*—Toren, McGeady & Associates

[57] ABSTRACT

A hand-held device with a holder for a working tool has a sensing mechanism for automatically initiating different operating modes. Different configurations of working tools inserted into the holder can be sensed by sensing elements in the form of balls. The balls cooperate with pivotal levers and a sensor for producing switching signals for initiating a switching operation.

8 Claims, 2 Drawing Sheets

HAND-HELD DEVICE WITH TOOL SENSING MEANS

BACKGROUND OF THE INVENTION

The present invention is directed to a hand-held device including a holder for a working tool and sensing means for initiating a switching operation. The sensing means checks the configuration of a work tool inserted into the holder and cooperates with a sensor in the device. The sensing means includes at least one control element movably displaceable within an opening in the holder with the axis of the opening extending transversely of the axis of the holder, and a sensing member cooperating with the control element.

An electrically operated hand-held device for automatically adjusting to various modes of operation is known from the U.S. patent application 134,516. In such device, there is a sensing mechanism for initiating the switching operation. The configuration of the shank of the working tool inserted into the holder is sensed and evaluated for effecting the switching operation. The sensing mechanism includes a slide, adjusted in the axial direction of the holder, and one or more control elements at which the slide is axially supported in accordance with the configuration of the working tool.

SUMMARY OF THE INVENTION

Therefore, it is the primary object of the present invention to provide a hand-held device including sensing means for initiating a switching operation corresponding to the working tool inserted into the device. Further, the invention affords a short constructional length of the hand-held device and is suitable for sensing slightly formed configurations.

In accordance with the present invention, the sensing means includes a sensing member in the form of a two-armed pivotal lever with a pivot axis extending transversely of the axis of the working tool, that is, the axis of the holder for the tool. One of the two lever arms is supported at a control element, while the other lever arm spaced from the control element cooperates with a sensor and moves in the radial direction relative to the holder axis so that it is closer to the sensor when the control element moves into an opening in the holder than when the control element is prevented from moving radially inwardly through the opening.

The lever arm spaced from the control element pivots in the direction opposite to the lever arm cooperating with the control element. A translation of the radial inward and outward movement of the control element with respect to the lever arm spaced from it can be achieved by a corresponding selection of the lever arm lengths. The configuration of the working tool shank inserted into the holder can be formed with only slight differences so that the strength of the shank is not impaired.

Based on the configuration of the working tool shank to be sensed, a plurality of control elements and a corresponding number of pivotal levers can be arranged with the arms of the levers remote from the control elements being pivotally displaceable into a detection region of the sensor. When the hand-held device is switched on, the pivotal levers rotate along with the working tool holder around the axis of the holder, so that the lever arms spaced from the control elements produce signals in the sensor, for example, inductively, with the signal indicating their pivoted position. The signals generated can be evaluated for carrying out the switching operation. For example, a determined rotational rate can be adjusted in connection with the number of percussion strokes acting on the working tool based on the configuration of the working tool inserted into the holder and checked by the sensing means.

Preferably, the pivotal levers provided are arranged offset to one another in the circumferential direction of the working tool holder. By offsetting the pivotal levers and the control elements cooperating with them through an angle of 90°, there are two pairs of pivotal levers and control elements arranged diametrically opposite one another and offset in the same axial position relative to the working tool holder. This arrangement, in combination with the short constructional length of the hand-held device, makes it possible to initiate a plurality of switching operations.

In an advantageous manner, spring means bias one lever arm of the pivotal levers against the control element. The spring means may be compression springs acting on each of the pivotal levers. When there is a configuration, such as a recess, in the shank of the working tool inserted into the holder, the configuration is assigned to a corresponding control element and the control elements are biased toward the shank of the working tool by the spring means when the shank is locked in the working tool holder. The lever arm of the pivotal lever, remote from the control element, thus assumes a pivoted position corresponding to the configuration contacted by the control elements.

To produce switching signals of different kinds and, accordingly, to achieve differentiation in the switching operations, the lever arms of the pivotal levers remote from the control elements have surfaces moving into the detection region of the sensor which have different dimensions relative to one another. When the device has two pairs of pivotal levers, the lever arms of one pair are provided with larger surfaces than the other pair.

In one embodiment of the invention, the lever arm of the pivotal lever, spaced from the control element, is formed of a magnetic material. It is possible that only this one lever arm is formed of a magnetic material, preferably a permanent magnet, however, the entire pivotal lever can be formed as a magnet. By using magnetic lever arms, a Hall element is suitable as the sensor and such an element is advantageous because of the favorable production costs. The Hall element detects a magnetic field corresponding to the position of the pivotal lever.

Preferably, the pivotal levers are guided in an actuating sleeve limitedly rotatable about the working tool holder. The actuating sleeve cooperates with locking members which hold the working tool in the holder whereby the pivotal levers are located in operationally effective positions relative to the control elements when the locking members reach the locking position by turning the actuating sleeve into a defined position about the holder axis. Accordingly, there is defined reciprocal dependency of a working tool and the support of the pivotal levers at the control elements. In addition to simple handling, this arrangement has advantages with respect to control of the switching operations, particularly where the lever arms have surfaces of different dimensions.

In a preferred embodiment, balls are used as the control elements. The shape of the balls is advantageous with respect to both assembly and operation.

In accordance with another feature of the invention, at least one recess for the control elements of the sensing mechanism is provided in the shank of the working tool inserted into the holder in the hand-held device. Such a recess, preferably in the form of an elongated groove, forms the configuration to be sensed. The depth of the elongated groove can be small, since a sufficient translation, that is, an enlargement of the radial movement of the control elements, can be provided by means of different lengths of the oppositely directed lever arms of the pivotal levers. If the shank of a working tool has more than one elongated groove, the elongated grooves are spaced apart around the circumferential direction of the shank. As a result, it is possible to place the elongated grooves at equal or different angular distances from one another. Different angular distances can be used as influencing factors in generating switching signals.

Moreover, the working tool can be used in hand-held devices of different types by a corresponding length of the elongated grooves or by arranging elongated grooves, one behind the other. Hand-held devices of different types are distinguished from one another, for example, with respect to switchable functions or output and also include sensing mechanisms constructed of different dimensions. Accordingly, it can be insured that a given working tool is only insertable into a hand-held device which is suitable for the working tool and is able to control the different operating modes. If a working tool is inserted into a hand-held device which is not compatible with it, no switching signals are produced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
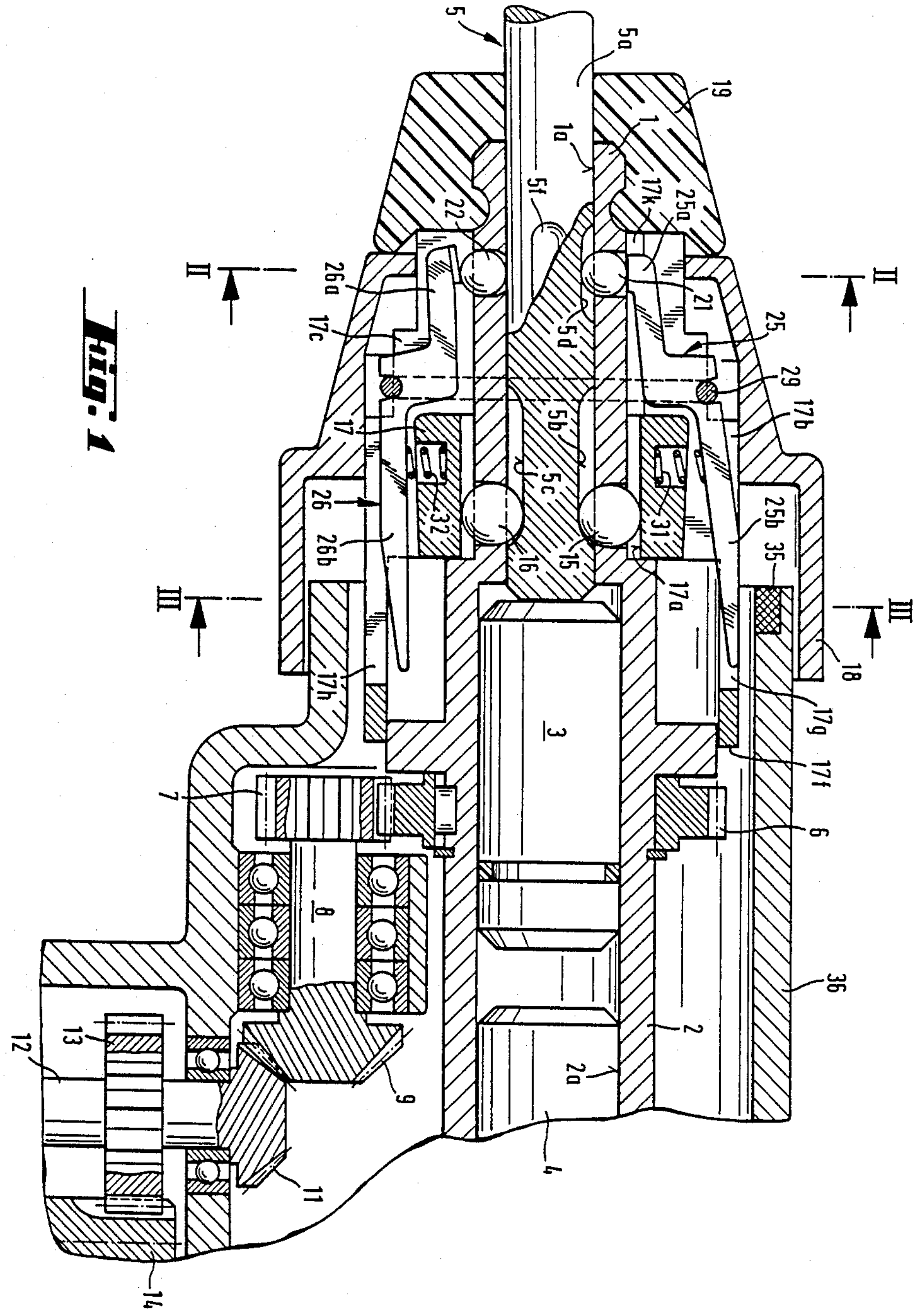
FIG. 1 is a partial view of a hand-held device shown in cross-section and illustrating the leading end of the device in which a sensing mechanism and an inserted working tool are displayed.

In FIG. 1, the front or leading end of a hand-held device is shown or, more specifically, a hammer drill for transmitting both rotational movement and percussion strokes to a working tool secured in the drill. As viewed in FIG. 1, the various parts forming the drill have a leading end and a trailing end with the drilling axis of the device extending in the trailing end-leading end direction, that is, from the right to the left. Percussive force directed to a working tool is transmitted by the tool to a material being worked on and a defined axial displaceability of the working tool in the hammer drill is required in transmitting percussion force.

Figures 2, 3, 4, 5, 6, 7, 8:
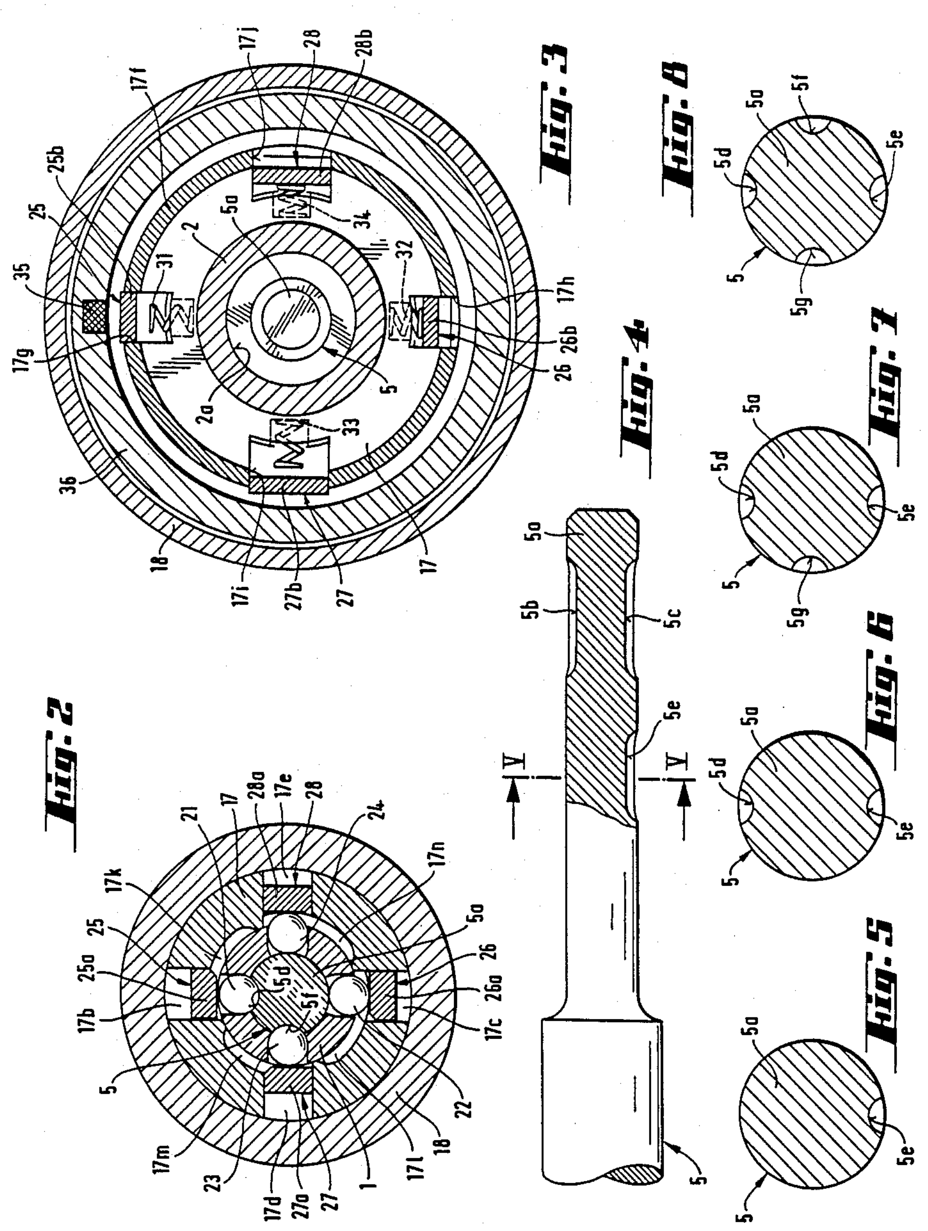
FIG. 2 is a cross-sectional view taken along the line II—II in FIG. 1.
FIG. 3 is a cross-sectional view taken along the line III—III in FIG. 1.
FIG. 4 is a side view, partly in section, of the trailing end of a working tool, that is, the shank end insertable into the hand-held device.
FIG. 5 is a sectional view taken along the line V—V in FIG. 4 and shown on an enlarged scale.
FIGS. 6, 7 and 8 are sectional views similar to FIG. 5, illustrating different embodiments of the configuration of a working tool.

The hammer drill illustrated in FIGS. 1, 2 and 3, includes an axially elongated tubular holder 1 for a working tool 5. Formed monolithically with and extending from the holder 1 is a tubular guide cylinder 2. The holder 1 and the guide cylinder 2 are arranged coaxially. Guide cylinder 2 has an axially extending bore *2a*, and a guide bore *1a* extends from the bore *2a* through the holder 1 with the holder bore having a smaller diameter than the guide cylinder bore. At its trailing end, the holder bore *1a* opens into the leading end of the guide cylinder bore *2a*. An anvil 3 is slidably displaceably mounted within the bore *2a* and a percussion piston 4 is also located within the same bore in spaced relation to the anvil. The percussion piston 4 is part of a known mechanism which reciprocates the anvil 3. As it reciprocates, anvil 3 transmits percussive strokes from the piston 4 to the trailing end of a working tool 5 inserted into the holder bore *1a*. The working tool has a cylindrically shaped shank end *5a* and, as can be seen in FIG. 1, projects into the leading end of the bore *2a* where it is contacted by the leading end of the anvil.

For the rotation of the holder 1, a toothed wheel or gear 6 is secured on the outside surface of the guide cylinder 2 and meshes with another toothed wheel or gear 7 mounted on a shaft 8 located below the guide cylinder 2. Shaft 8 has a beveled gear 9 at its trailing end in engagement with a driving bevel gear 11. Bevel gear 11 is driven by a shaft 12 and a gear 13 on the shaft 12 meshes with a motor pinion 14 as shown in FIG. 1 for effecting the rotation of the guide cylinder 2 and the holder 1.

The inserted shank end *5a* of the working tool 5 has two diametrically opposite axially extending grooves *5b*, *5c* for retaining the working tool within the holder 1 so that it can be axially displaced in a defined manner and also for transmitting rotational movement of the holder 1 to the working 5. Spherical locking members or balls 15, 16 are supported in openings located in the holder 1 with the openings extending from the outside to the inside surface of the holder and with the axes of the openings extending transversely of the axial direction of the holder. The locking members 15, 16 can be displaced radially inwardly into the grooves *5b*, *5c* in the shank end *5a* of the working tool 5 by means of an actuating sleeve 17.

The actuating sleeve 17 extends around the holder 1 and the guide cylinder 2 and extends in the axial direction of the holder. Actuating sleeve 17 has a known inside surface *17a* which is shaped in the circumferential direction for pressing the locking members 15, 16 radially inwardly into the grooves *5b*, *5c* in the working tool. By the defined limited rotation of the actuating sleeve 17, the locking members 15, 16 can move radially inwardly or outwardly relative to the openings in the holder 1. An actuating collar 18 encircles the actuating sleeve 17 and is accessible on the exterior of the drill for rotating the actuating sleeve. At the leading end of the drill there is a protective ring 19 extending over the leading end of the holder 1 for preventing drilled material and the like from entering into the drill. Preferably, the protective ring is formed of an elastic material.

Further, in a defined circumferential position, relative to the position of the locking members 15, 16, control elements in the form of balls 21, 22, 23, 24 are supported in openings extending through the wall of the holder 1 with the balls being radially displaceable and also offset relative to one another at equi-angular dimensions, note FIG. 2. The openings for the balls 21, 22, 23, 24 are located closer to the leading end of the holder 1. Up to four recesses in the form of elongated grooves **5*d*, 5*e*, 5*f*, 5*g* (FIGS. 4 to 8) are formed in the surface of the shank end 5*a* and correspond to the balls 21, 22, 23, 24 for providing a coded character for the working tool. Based on the number of balls 21, 22, 23, 24, a corresponding number of pivotal levers 25, 26, 27, 28 are positioned into axially extending slot-shaped recesses 17*b*, 17*c*, 17*d*, 17*e* of the axially extending actuating sleeve 17. Intermediate the leading end and the trailing end of the pivotal levers there is a spring ring 29 which engages into a radially outer notch in the levers for supporting them radially in the actuating sleeve 17. The spring ring 29 acts as a pivot bearing for the levers. Pivotal levers 25, 26, 27, 28 are two-armed levers having a first lever arm 25*a*, 26*a*, 27*a*, 28*a* extending from the spring ring 29 toward the leading end of the drill and second lever arms 25*b*, 26*b*, 27*b*, 28*b* extend from the spring ring 29 toward the trailing end of the drill. Each first lever arm 25*a*, 26*a*, 27*a*, 28*a* is supported in alignment one of the balls 21, 22, 23, 24. Two angularly spaced elongated grooves 5*d*, 5*f* in the surface of the shank end 5*a* of the working tool 5 are located opposite the balls 21, 23 in the embodiment displayed in FIGS. 1, 2 and 3 so that the balls can move inwardly relative to the openings in the holder 1 and seat within the elongated grooves. Pressure springs 31, 32, 33, 34 are mounted in the actuating sleeve 17 and extend outwardly into engagement with corresponding ones of the second lever arms 25*b*, 26*b*, 27*b*, 28*b*. The springs 31, 32, 33, 34 press the second lever arms radially outwardly and bias the first lever arm 25*a*, 26*a*, 27*a*, 28*a* radially inwardly into contact with the balls 21, 22, 23, 24. The springs are spaced in the axial direction of the holder from the balls. As a result, due to the action of the springs 31, 32, 33, 34, the second lever arms 25*b*, 26*b*, 27*b*, 28*b* pivot outwardly while the first lever arms 25*a*, 26*a*, 27*a*, 28*a* pivot inwardly. Due to the pivotal action of the levers, in the arrangement shown in FIGS. 1, 2 and 3, the balls 21, 23 seat within the elongated grooves 5*b*, 5*f*, with the second lever arms 25*b*, 27*b*** pivoting radially outwardly.

Axially extending slot-shaped through opening **17*g*, 17*h*, 17*i*, 17*j* are formed in an annular extension 17*f* of the actuating sleeve forming a continuation of the elongated recesses 17*b*, 17*c*, 17*d*, 17*e*. As illustrated in FIGS. 1, 2 and 3, the radially outwardly pivoted second lever arms 25*b*, 27*b*, enter into the through openings 17*g*, 17*i*. As displayed in FIG. 3, the first lever arms 25*b*, 26*b*, 27*b*, 28*b* spaced from the balls 21, 22, 23, 24 have widths which differ in pairs and this width characteristic is also present in the through openings 17*g*, 17*h*, 17*i*, 17*j* in a similar manner. It can be noted in FIG. 3 that the width of the through opening 17*g*, 17*h* and of the second lever arm 25*b*, 26*b* are smaller than the widths of the other pair of through openings 17*i*, 17*j* and second lever arm 27*b*, 28*b***.

The drill includes a housing 36 extending from the trailing end of the actuating collar 18 toward the trailing end of the drill. At the leading end of the housing 36, laterally enclosing the extension **17*a* of the actuating sleeve 17, a sensor 35 is located in the axial region of the through opening 17*g*, 17*h*, 17*i*, 17*j* and is spaced slightly radially outwardly from the extension 17*f*. While the holder 1 rotates along with the actuating sleeve 17 and the pivotal levers 25, 26, 28, the sensor 35 determine if the number of the through openings 17*g*, 17*h*, 17*i*, 17*j* are free corresponding to the pivotal positions of the pivot levers 25, 26, 27, 28 and whether or not the second lever arms 25*b*, 26*b*, 27*b*, 28*b* have swivelled into the through openings 17*g*, 17*h*, 17*i*, 17*j*, according to width, that is, whether the second lever arms with a larger or smaller surface facing the sensor is located within the through openings. The sensor 35 transmits this information in the form of switching signals for use in an electrical switching process. Based on the configuration or arrangement of the recesses or grooves in the surface of the shank end 5*a* of the working tool 5**, the operating mode of the drill can be determined and adjusted automatically.

To remove the working tool 5 from the holder 1, the actuating sleeve 17 is turned around the axis of the holder in a limited extent by means of the actuating collar 18. Accordingly, locking members 15, 16 can move radially outwardly into known deflecting recesses in the inner surface **17*a* of the actuating sleeve 17. At the same time, the pivotal levers 25, 26, 27, 28 move from alignment with the balls 21, 22, 23, 24 so that the balls can move radially outwardly from the recesses 17*b*, 17*c*, 17*d*, 17*e* into the recesses 17*k*, 171, 17*m*, 17*n*, note FIG. 2**.

In FIG. 4, working tool 5 is shown in an embodiment different from that in FIG. 1 and 2 with respect to the elongated grooves. In the embodiment of FIG. 4, only one elongated groove **5*e* is present, note also FIG. 5. In the embodiment of FIG. 6, two elongated grooves 5*d*, 5*e* are formed diametrically opposite one another. In the embodiment of FIG. 7, there are three elongated grooves 5*d*, 5*e*, 5*f* with the spacing between the grooves 5*d* and 5*g*, and 5*g* and 5*e* being equal, while the spacing between grooves 5*d* and 5*e* is twice as large. In the embodiment of FIG. 8, four elongated grooves 5*d*, 5*e*, 5*f*, 5*g*** are equi-angularly spaced from one another. Other arrangements of the elongated grooves are possible and usable for generally different switching signals.

While specific embodiments of the invention have been shown and described in detail to illustrate the application of the inventive principles, it will be understood that the invention may be embodied otherwise without departing from such principles.

We claim:

1. A hand-held device including an axially extending tubular holder for a working tool and sensing means for initiating a switching operation, said sensing means checks the configuration of the surface of a working tool inserted into said holder and cooperates with a sensor mounted in the device, said sensing means comprises at least one control element displaceably mounted in an opening extending through said holder with the opening having an axis extending transversely of the axis of said holder, a sensing member for said control element, said sensing member is an elongated two-armed pivotal lever extending generally in the axial direction of said holder and having a pivot axis spaced from said control element and extending transversely of the axis of said holder, said pivot lever has a first lever arm and a second lever arm each extending oppositely from the pivot axis, said first lever arm contacts said control element at a location spaced from said pivot axis, said second lever arm cooperates with said sensor and is pivotally displaced toward said sensor when said contact element moves radially inwardly in said opening toward the axis of said holder.

2. A hand-held device, as set forth in claim 1, wherein a plurality of said control elements are mounted in corresponding said openings in said holder with a corresponding number of pivotal levers provided spaced apart around said holder in spacing corresponding to the spacing of said control elements.

3. Hand-held device, as set forth in claim 2, wherein a separate spring means engages each of said pivotal levers and biases the first lever arms thereof into contact with said control elements.

4. A hand-held device, as set forth in claim 3, wherein said second lever arms of said pivot levers have surfaces of different dimensions facing said sensor.

5. A hand-held device, as set forth in claim 4, wherein said second lever arms of said pivotal levers are magnetic.

6. A hand-held device, as set forth in claim 5, wherein an axially extending actuating sleeve laterally enclosing said holder and said pivotal levers are guided in said actuating sleeve, and said actuating sleeve is rotatable for a limited extent relative to and about the axis of said holder.

7. A hand-held device, as set forth in claim 2, wherein said control elements are balls.

8. A hand-held device, as set forth in claim 1, including a working tool for insertion into said holder, said working tool having a shank end insertable into said holder and having a circumferential surface with at least one recess in said circumferential surface for receiving one of the control elements.

* * * * *